(12) United States Patent
Van Pottelbergh et al.

(10) Patent No.: US 10,328,435 B2
(45) Date of Patent: Jun. 25, 2019

(54) PRE-ENGINEERED RECYCLABLE PRODUCTS

(75) Inventors: Eric Van Pottelbergh, Geetbets (BE); Bart Verhasselt, Willebroek (BE)

(73) Assignee: Reculiner BVBA, Geetbets (BE)

( * ) Notice: Subject to any disclaimer, the term of this patent is extended or adjusted under 35 U.S.C. 154(b) by 1511 days.

(21) Appl. No.: 14/343,828

(22) PCT Filed: Sep. 7, 2012

(86) PCT No.: PCT/EP2012/067562
§ 371 (c)(1),
(2), (4) Date: Jun. 15, 2014

(87) PCT Pub. No.: WO2013/034727
PCT Pub. Date: Mar. 14, 2013

(65) Prior Publication Data
US 2014/0306039 A1    Oct. 16, 2014

(30) Foreign Application Priority Data
Sep. 7, 2011    (EP) ................................ 11180476

(51) Int. Cl.
*B02C 23/08*    (2006.01)
*A01G 24/00*    (2018.01)
(Continued)

(52) U.S. Cl.
CPC .............. *B02C 23/08* (2013.01); *A01G 18/00* (2018.02); *A01G 24/00* (2018.02); *A47C 27/122* (2013.01);
(Continued)

(58) Field of Classification Search
CPC ........ B29L 317/04; C08J 11/06; B02C 23/08; B02C 23/14; B29B 17/04; A01G 24/00;
(Continued)

(56) References Cited

U.S. PATENT DOCUMENTS 3,718,536 A * 2/1973 Downs ................... B27N 3/007
100/914
4,123,489 A 10/1978 Kelley
(Continued)

FOREIGN PATENT DOCUMENTS

AU    2011223044    9/2012
DE    2020 055    12/1971
(Continued)

OTHER PUBLICATIONS http://en.wikipedia.org/wiki/Release_liner.
(Continued)

*Primary Examiner* — Jessica Cahill
*Assistant Examiner* — Smith Oberto Bapthelus
(74) *Attorney, Agent, or Firm* — Levy & Grandinetti

(57) ABSTRACT

The present invention relates to a method for treating a plastic and/or paper waste material having steps including collecting a plastic and/or paper waste material, preferably paper, and highly preferably a release coated cellulose or polymeric sheet material. The material already includes a selected new-use additive preferably selected from flame retardant, hydrophobic material, pesticide, herbicides, minerals, nutrients, and/or mixtures thereof. The method includes the step of preparing the collected material by mixing, separating foreign bodies like metals, etc., and feeding it to a grinding station. The method also includes the step of, in one or several grinding stations, shredding and grinding the materials into small pieces.

5 Claims, 4 Drawing Sheets

(51) Int. Cl.
*A01G 18/00* (2018.01)
*B02C 23/14* (2006.01)
*B29B 17/04* (2006.01)
*B68G 1/00* (2006.01)
*C08J 11/06* (2006.01)
*D21B 1/08* (2006.01)
*D21B 1/10* (2006.01)
*E04B 1/78* (2006.01)
*A47C 27/12* (2006.01)
*E04B 1/76* (2006.01)
*E04B 1/74* (2006.01)

(52) U.S. Cl.
CPC .............. *B02C 23/14* (2013.01); *B29B 17/04* (2013.01); *B68G 1/00* (2013.01); *C08J 11/06* (2013.01); *D21B 1/08* (2013.01); *D21B 1/10* (2013.01); *E04B 1/7604* (2013.01); *E04B 1/78* (2013.01); *E04B 2001/746* (2013.01); *Y02A 30/248* (2018.01); *Y02W 30/642* (2015.05); *Y02W 30/644* (2015.05); *Y02W 30/701* (2015.05)

(58) Field of Classification Search
CPC ........ A01G 18/00; A47C 27/122; B68G 1/00; D21B 1/08; D21B 1/10; E04B 1/1078; E04B 1/7604; E04B 2001/746; Y02W 30/642; Y02W 30/644; Y02W 30/701; Y02A 30/248
USPC ...................................... 241/25, 24.18, 24.28
See application file for complete search history.

(56) References Cited

U.S. PATENT DOCUMENTS

| | | | | |
|---|---|---|---|---|
| 4,133,490 A | * | 1/1979 | Jackson | .................. B02C 23/02 198/671 |
| 4,182,681 A | | 1/1980 | Gumbert | |
| 5,122,228 A | * | 6/1992 | Bouchette | ................ D21B 1/32 162/21 |
| 5,275,855 A | | 1/1994 | Kobayashi et al. | |
| 5,534,301 A | * | 7/1996 | Shutt | ...................... D21H 21/34 106/15.05 |
| 6,036,234 A | | 3/2000 | Chess | |
| 6,279,748 B1 | * | 8/2001 | Nakamura | ................ B03B 9/06 209/12.2 |
| 7,226,006 B2 | * | 6/2007 | Porter | ..................... A61L 11/00 209/11 |
| 7,927,703 B2 | * | 4/2011 | Xia | ........................... B32B 7/12 428/412 |
| 2002/0025421 A1 | | 2/2002 | Sugawara et al. | |
| 2009/0068463 A1 | * | 3/2009 | Mochizuki | ................ D01F 8/12 428/370 |

FOREIGN PATENT DOCUMENTS

| | | |
|---|---|---|
| DE | 43 31 567 | 2/1995 |
| DE | 20 2005 014 581 U1 | 2/2007 |
| EP | 2 363 544 | 9/2011 |
| JP | 07-279099 | 10/1995 |
| WO | WO 2005/028111 | 3/2005 |
| WO | WO 2005/110902 | 11/2005 |
| WO | WO 2011/107476 | 9/2011 |

OTHER PUBLICATIONS www.ssiworld.com/watch/industrial_paper.htm.
www.ssiworld.com/watch/printers-waste.htm.
www.scribd.com/full/27498804?accesskey=key-2ed7qzqp8lalulhgo86i.
Sassine et al., "Waste Paper as an Alternative for Casing Soil in Mushroom," Journal of Applied Sciences Research, vol. 1(3):277-84 (2005).
www.healthyhouseinstitute.com/a_688-Cellulose_Insulation.
www.x-floc.com/en/zubehoer/schlaueche-zub.html.
www.ssi.world.com Industrial Shredder Manufacturer.

* cited by examiner

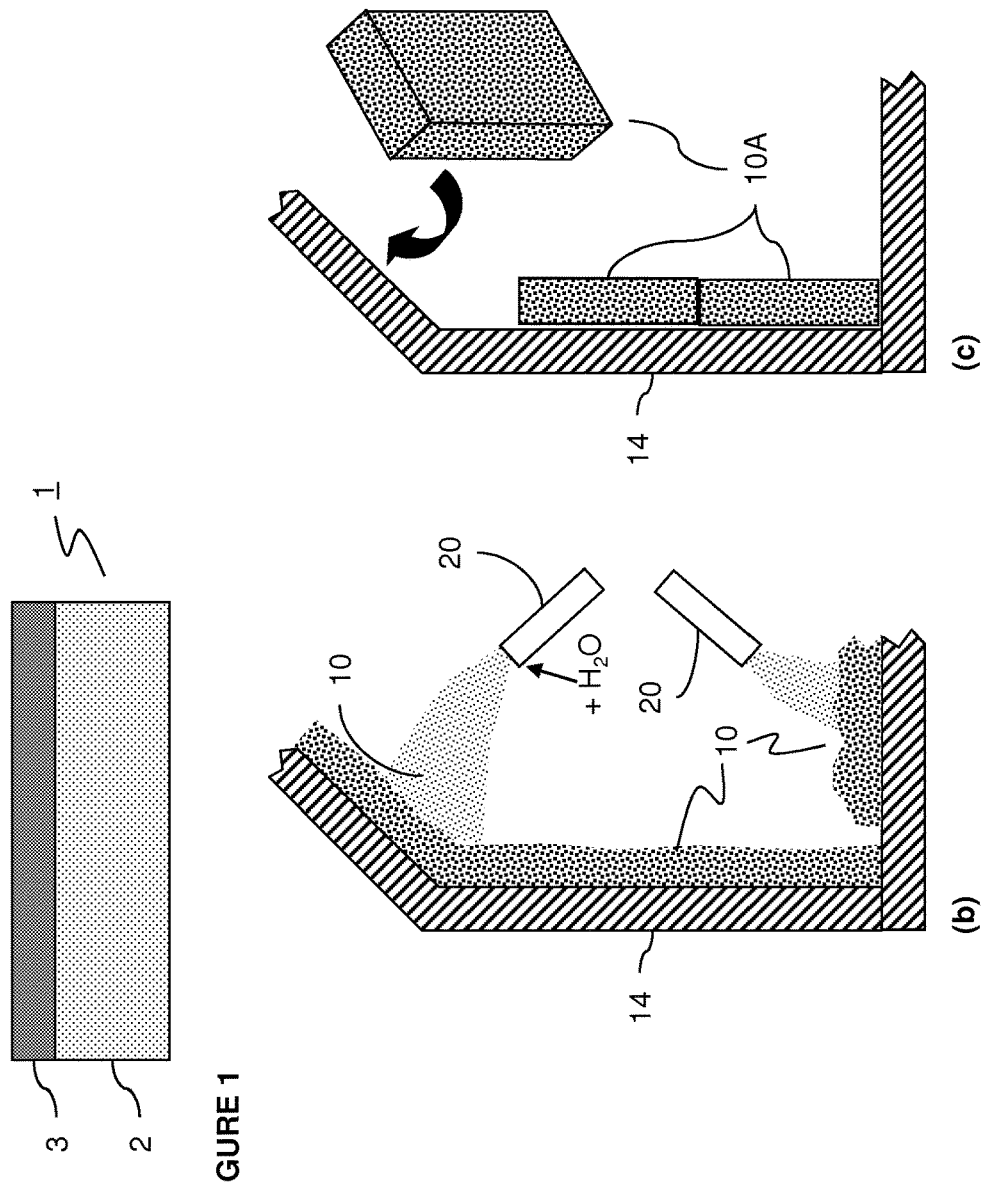
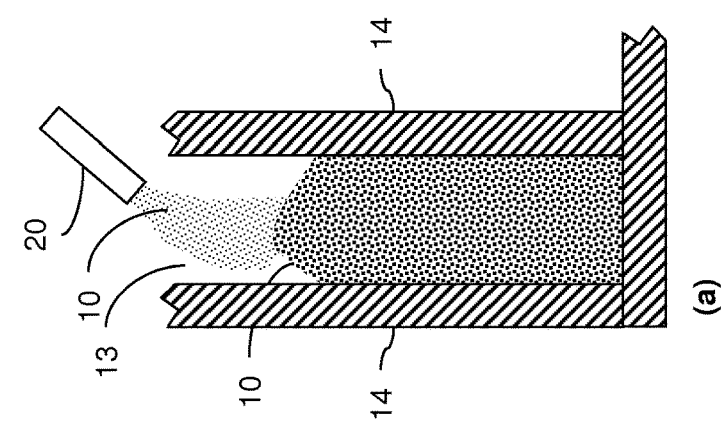
FIGURE 1
FIGURE 3

PRE-ENGINEERED RECYCLABLE PRODUCTS

This Application is the U.S. National Phase of International Application Number PCT/EP2012/067562 filed on Sep. 7, 2012, which claims priority to European Patent Application No. 11180476.1 filed on Sep. 7, 2011.

TECHNICAL FIELD

The present invention relates to pre-engineered recyclable products (pre-engineered waste material) such as plastic products and paper products whereby specific tailored additives are already incorporated into to the product formulations, such that the resulting treated waste material of said products can be more easily transformed into a new use or application without having the need to add such specific tailored additives for the new application upon manufacturing the product for its new use.

BACKGROUND FOR THE INVENTION

Waste material is everywhere and numerous efforts have been taken to find ecologically and economically justified solutions to address this challenge.

A typical example of waste material are paper related products, among others, finding its origin in the label manufacturing. Self adhesive labels, films, and tapes have become very popular for their versatility and ease of use, since no extra glue is required to make them adhere to a substrate. They are used extensively in offices and by school children of course, but also large volumes are used by industries for labelling their products. The self-adhesive labels are provided attached to a release liner made of paper or a polymeric carrier and usually coated at least on one side with a release agent, most often consisting of a silicone release layer, which provides a release effect against the adhesive of the label. Other release agents are sometimes used, such as wax, paraffin, low surface energy fluorinated compounds, etc. Examples of silicone coated liners are given in U.S. Pat. No. 5,275,855, JP07279099, and U.S. Pat. No. 6,036,234. Silicone or other release agent coated liners are also used more generally as backing in the production of films, such as PVC films. The total global consumption of release liners in 2008 is believed to be around 32 Billion square meter of coated product, which is equal to 75% of the surface area of Switzerland. Approximately 85% of this material is paper based and 15% is plastic based (cf. http://en.wikipedia.org/wiki/Release_liner).

After use of the labels, films or tapes supported on said carriers, the liners are pure waste and must be disposed of. Considering the volumes mentioned above, there is a great source of waste, which is coming under the scrutiny of several governments which intend to tax the disposal thereof as packaging material. The building and transportation industries are making more and more use of cellulose materials coming from old newspaper, cardboard, etc. to manufacture heat and acoustic insulating materials in the form of loose fibrous materials, fibrous mats with or without skins, panels of varying stiffness, and even hollow blocks; the manufacture of blocks and panels may require the use of a binder, a glue or a cement.

Next to paper waste material, products made from or incorporating plastic and or rubber materials are part of almost any aspect of daily life. Some of the prevalent primary polymer types in the waste plastic materials are ABS, HIPS, PP, PET and PC. Generally, the plastic or rubber materials that are used to create these products are formed from virgin plastic materials that are produced from petroleum and are not made from existing stock. Literally millions of tons of plastic and rubber are produced and consumed each year. Recycling plastic materials obviates the need for disposing of the plastic materials or product. Further, in an era of reduced and more expensive petroleum material cost, the expense of production of the plastic is reduced as less further petroleum is necessary for the production. When plastic materials are sent to be recycled, the feed streams rich in plastics may be separated into multiple product and by product streams. Generally, the recycling processes can be applied to a variety of plastics-rich streams derived from post-industrial and post-consumer sources. For example, these streams may include plastics from office automation equipment (printers, computers, copiers, etc.), white goods (refrigerators, washing machines, etc.), consumer electronics (televisions, video cassette recorders, stereos, etc.), consumables (diapers, plastic utensils, plastic cups, etc.), automotive shredder residue, packaging waste, household waste, building waste and industrial scrap (molding, non-woven, fiber, extrusions, etc.). There continues to be a need for systems and methods that will further improve the efficiency with which waste plastic and rubber materials are reclaimed and the quality of the resultant reclaimed plastic. In particular, there is a continuing need for systems and methods that are useful for processing waste plastic material from any prospective plastic waste stream into reclaimed polymeric materials. Many variations exist, depending on at least the nature of the shredding operation. Plastics from more than one source of durable goods may be including in the mix of materials fed to a plastics recycling plant, which means that a very broad range of plastics may be included as potential sources of waste plastic material.

From the above it is clear that there remains in the art a need for finding and stimulating routes to recycle waste material. In parallel, there remains a lot to do in the fields of recycled waste material such as paper and of insulation materials for the building, transportation, and other industries to provide a new application/new product, via an environmentally, economically viable and sustainable route, thereby providing acceptable properties such as meeting specifications required for a given application.

The present invention now proposes a solution to these and other problems in the art of recycling.

SUMMARY OF THE INVENTION

According to one specific embodiment, the present invention concerns a method for treating a plastic and/or paper waste material comprising the following steps:

(a) Collecting a plastic and/or paper waste material, preferably paper, highly preferably a release coated cellulose or polymeric sheet material, said material already comprising selected new-use additive preferably selected from flame retardant, hydrophobic material, pesticides, minerals, nutrients and/or mixtures thereof (b) Optionally preparing the collected material by mixing, separating foreign bodies like metals, etc., and feeding it to a grinding station;

(c) In one or several grinding stations shredding and grinding the materials into small pieces.

The present invention can be understood more readily by reference to the following detailed description, examples, drawing, and claims, and their previous and following description. However, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting. The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

According to one embodiment of the present invention, the present invention is directed to pre-engineered recyclable products such as plastic products and paper products whereby specific tailored additives are added to the product formulations, such that the treated waste material of said products can be transformed into a readily available second product without having the need to add such specific tailored additives upon the making of the second product. In general terms, the present invention is directed to recycling of a recyclable product said recyclable product already formulated with a selected additive whereby said selected additive has a functional characteristic in support of the new application of the recycled product referred to as "new-use additive". Said additive may also have a functionality within the recyclable product but aims at providing the functionality needed in support of the new application. Examples of this have been described in U.S. Pat. No. 3,718,536A, EP2363544A1, WO2011/107476A2 and others. The functionality needed in support of the new application will in most cases differ from the functionality of the additive present within the recyclable product composition. It can be understood that if said additive interferes with the recyclable product properties that necessary precautions may be taken such as protection in a specific form like encapsulation or absorption within porous structures. In a number of specific cases, the recyclable product may be formulated with a "dormant additive", the definition of this "dormant additive" being that the physical properties of the recyclable product either containing the dormant additive or not, and this in relation to its intended application are not substantially different, and both types of recyclable materials with an without dormant additive are interchangeable. As a result of this, a dormant additive will in most cases be present in a homogeneous mixture with the original product formulation and components rather than as a physically distinct part or layer in the recyclable product.

According to one specific embodiment of the present invention, the key difference of the present invention with previous attempts to recycle plastic and/or paper waste material such as release coated sheet material, is that the recyclable release coated sheet material composition is already formulated with an additive being key to the functionality needed for a given new use of the recycled product. A preferred additive for paper waste material are fire retardants.

In case of paper waste material, such as release coated sheet material, the efficacy of the method of the present invention is further enhanced if the release coated cellulose or polymeric sheet material is collected from producers and end-users thereof in the form of dense, bulky masses, such as rolls and stacks, which are pre-shredded into smaller, less dense masses in preparation to step (b).

Great advantages in the fields of insulation materials and filling for upholstery which will be discussed more in detail below can be reached if said collected material already comprises a flame retardant, such as boric acid or any salt thereof. The flame retardant would be added to the sheet carrier by the sheet manufacturer, thus anticipating, driving and promoting the recycling of the produced material.

The present method is highly advantageous as it is possible for certain release agent coated sheets to mechanically separate, during the primary and/or secondary dry-grinding operations, a substantial fraction of the release coating from the sheet carrier, in the absence of any chemical treatment. The two fractions may then be separated in a separating station, separating the incoming stream into a first, carrier rich fraction and a second, release agent rich fraction. The separating station may comprise one or more of a cyclone, a filter, and an ultrasonic or an electrostatic separation means. This embodiment is very advantageous as it permits the use of the carrier rich fraction to be further processed to produce either insulation materials, e.g., in the form of insulation batts or sheets; or to incorporate a conventional repulping process in an aqueous medium for producing recycled paper. Note that insulation materials need not necessarily be formed from a carrier rich fraction, and are advantageously obtained directly from the comminuted release coated cellulose or polymeric sheet material, possibly blended with e.g., comminuted waste paper such as newspaper, to yield insulation materials of different grades, qualities, and prices. Alternatively, the cellulose and/or the release agent rich fractions may further be treated to become suitable for use as a filler, a binding agent or a viscosity modifier in concrete, cementitious, asphalteous, clay or lime mixtures and coatings, paints and other building materials.

At any stage of the method, the collected or treated material may be blended with cellulose or polymeric sheet waste material from other origins, or with a release agent, for example from the release agent rich fraction obtainable from the separation discussed supra. Alternatively, the second, release agent rich fraction separated from the carrier material can be blended with ground cellulose or polymeric sheet waste material from other origins in order to control the content in release agent of the final material.

In case of a carrier comprising essentially cellulose which can be separated from the release coating by dry-grinding as discussed above, the cellulose rich fraction thus obtained may be further processed in a wet shaping station to form sheets of paper.

Some applications, such as in the building industry or upholstery, require the use of a flame retardant. In case the collected material does not comprise a sufficient amount of flame retardant for one such application, a flame retardant, preferably boric acid or any salt thereof may be added to, and mixed with the recycled material before, during or after the grinding steps (c).

A preferred source of release coated cellulose or polymeric sheet material is liners for holding self-adhesive labels or films. They can conveniently be collected at the liner manufacturers, the self-adhesive label base material manufacturers, the label printers, the producers of goods on which are applied self-adhesive labels, and so on, all of them generating large volumes of such liners. The release agent is generally one of silicone, wax, paraffin, polyurethane, fluorinated or acrylic based material.

Recycled material obtained from the method discussed above can be used in various applications facilitated by the new-use additive which was already incorporated into the formulation of the waste material composition. First, the thermal and acoustic insulating properties thereof can advantageously be used for insulating thermally and/or acoustically any of:

a wall, panel or roof in the field of buildings,
a panel in the field of transportation,
a sound dampening wall along roads;
a quilted piece of garment or blanket, or for filling
a mattress, or upholstery,
a package in the field of packaging and storage and transportation of goods.

Alternatively the recycled release coated cellulose material may be used for the production of recycled paper in a conventional wet process, provided a sufficient fraction of the release agent was removed during the dry-grinding process. Similarly, thermoplastic carriers, if sufficiently separated from their release coating, may be used in any thermoplastic recycling process well known in the art.

Another field of applications of release coated cellulose sheet material is casing soil or growing medium used for growing some vegetables and mushrooms, or as additive to earth to enhance the water balance and water flow in said soil or earth. Preliminary results have shown that the treated material offered an optimal water buffering effect for the growth, e.g., of mushrooms. Furthermore, the material seems to act as a heat capacitor, absorbing heat, which it gradually releases in time. This property may also partly explain the excellent growth of mushrooms observed with the present material. This property makes the material suitable for other applications such as hot pillows, or hot compresses to be applied onto the skin. Similarly, if a packaged good must be maintained at a high temperature, such as food, the heat capacitive properties of the material can be used to this effect, by e.g., lining the walls of the packaging with the present material, preferably sandwiched between two walls of the packaging.

Hydromulching/hydroseeding is another application wherein the present material shows excellent potential. Hydromulching is applying a slurry of water, wood fibre mulch, and often a tackifier, to prevent soil erosion. Hydroseeding, often used as synonym of hydromulching, is a method for planting seeds, e.g., in the field of grass planting, comprising the steps of mixing mulch, seed, fertilizer, and water in the tank of a hydromulching machine. The mixed material is then pumped from the tank and sprayed onto the ground. The material is often referred to as a slurry, much like a soupy batch of green papier-mâché. Once applied to the soil, the material enhances initial growth by providing a microenvironment beneficial to seed germination. The use of traditional recycled paper cellulose fibre material in hydromulching/hydroseeding applications is known. The use of recycled release coated cellulose sheet material treated according to the present invention instead of traditional recycled paper cellulose fibre seems advantageous in that the present material has a significantly lower tendency to create a dry crust as well as clogging together. Without wishing to be bound by any theory, it is believed that the release coating material present in the material contributes to this effect.

The present invention also concerns an insulation material comprising shredded recycled material obtainable by a method as discussed supra. In particular, it is preferred that the paper or thermoplastic sheet material is a liner for adhesive labels, tapes, or films, and is preferably coated with silicone as release agent and the carrier is as follows:

(a) the cellulose sheet material is paper, preferably glassine paper or kraft paper, or, alternatively,
(b) the polymeric sheet material is a thermoplastic film, preferably selected from PE, PP, or PET.

The insulation material of the present invention is preferably in a form suitable for blowing it dry into a cavity, as loose fill onto a surface, or wet against a surface. Alternatively, it can be in the form of a batt or a sheet.

BRIEF DESCRIPTION OF THE FIGURES

For a fuller understanding of the nature of the present invention, reference is made to the following detailed description taken in conjunction with the accompanying drawings in which:

FIG. 1: shows a transversal cut of a release coated carrier, typically used as liner for adhesive labels and the like.

FIG. 3: shows three embodiments for the application of an insulating material in a building or means of transportation;

DETAILED DESCRIPTION OF THE INVENTION

Figure 2A:
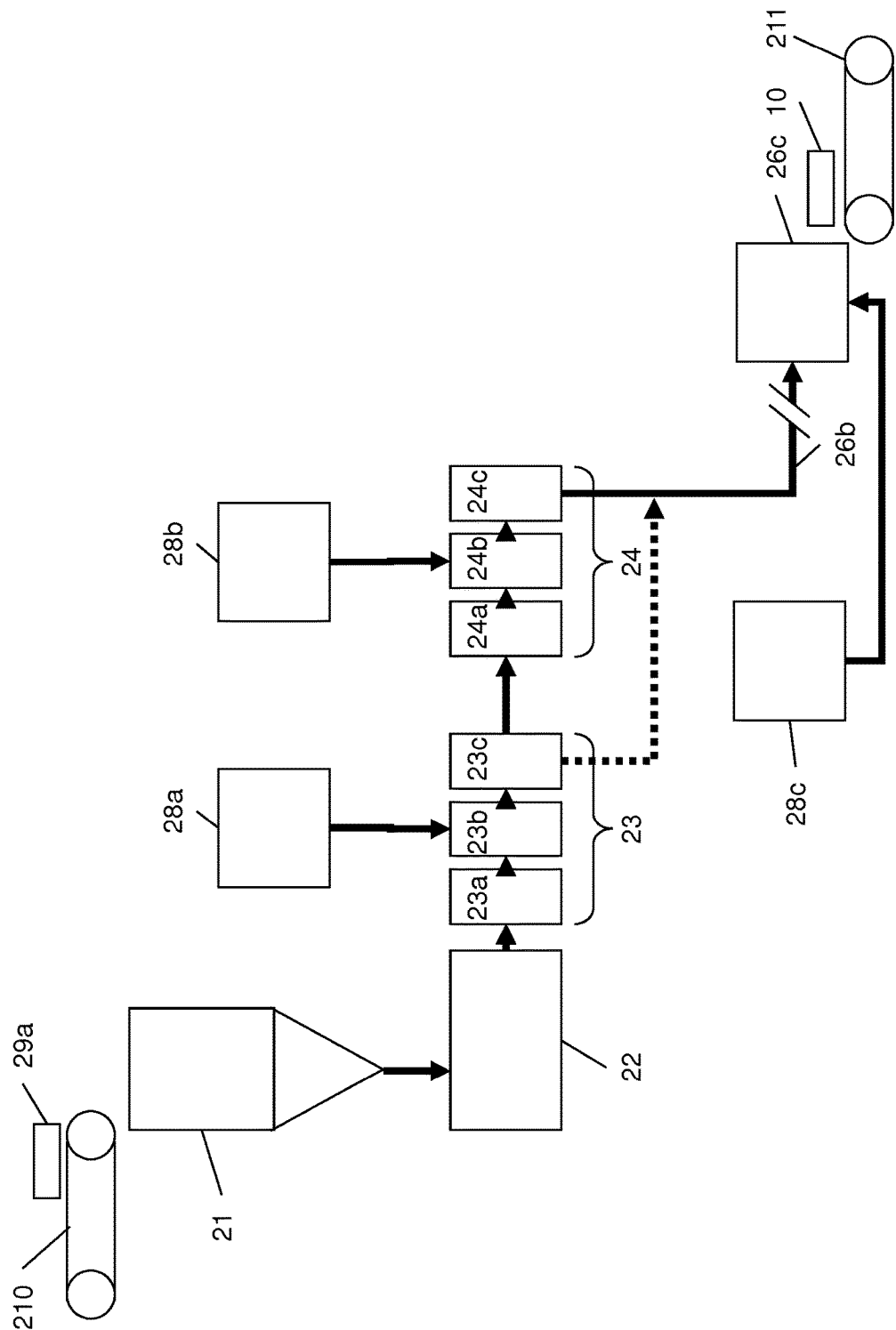
FIG. 2A: shows a schematic representation of a first embodiment of the method of the present invention.

According to one specific embodiment, the present invention offers a new and advantageous solution to the difficult problem of recycling release coated sheet carriers (1), in particular silicone coated carriers which are widely used e.g., as liners for self adhesive labels, tapes, films and the like. As illustrated in FIG. 1, such liners comprise a carrier (2) which is often a cellulose material, such as glassine paper or kraft paper, or alternatively, the carrier (2) can be a thermoplastic film, made of a polyolefin like PE or PP, or of a polyester such as PET, PEN, etc. In the present context, the term "sheet" is used to designate "a wide expanse or thin piece of something" (The Chambers Dictionary (2000)), which can be continuous or in discreet pieces of regular or irregular geometry, presented in any form such as rolled, stacked, or even crumpled. The carrier (2) is coated on one or two sides with a release agent (3), which provides a release effect against any type of sticky material such as the adhesive on a label. The release agents (3) most widely used on liners for adhesive labels, tapes, films, and the like, are crosslinkable silicones, but other release agents such as wax, paraffin, polyurethane, fluorinated or acrylic based material may also be found. Depending on the type of release agent and the intended use of the coated sheet material, the release agent is generally applied in an amount of the order 0.2 to 10.0 g/m$^2$, which is enough to degrade the quality of paper recycled with such cellulose based liners by traditional wet paper repulping processes, because the disintegration of the fibres is insufficient and the resin particles tend to stick on the rolls and felts. This is a major inconvenience because unlike newspapers and the like, paper used for liners is generally produced from virgin material, which has never gone through any recycling cycle and has therefore a high ecological value. As reviewed above, solutions exist to overcome this drawback associated with conventional wet repulping processes, but they require additional treatment steps and chemicals. The problem is even more acute when the carrier is a thermoplastic film since the generally cross-linked release coating cannot be easily separated from the carrier and may not be melted and reprocessed therewith.

According to one specific embodiment, the present invention provides a particularly advantageous alternative method for recycling both cellulose and thermoplastic based release coated carriers (1) such as liners. In the present invention, the release coated carrier may be processed to form a novel and advantageous insulating material (10) suitable for the sound and thermal insulation of buildings and of sound barriers along the roads, as well as of means of transportation such as automotive vehicles, trains, airplanes, and the like. It can also be used to fill quilted garments and blankets, or upholstery. Other applications are possible, such as growing medium for mushrooms, vegetables, plants, etc., or as heat capacitor in heated pillows or compresses to be applied on the skin.

In some cases of cellulose sheets coated with a release agent, it is possible to mechanically separate a sufficient amount of release agent from the cellulose carrier during a mechanical grinding step (23), (24). In this case, a cellulose rich fraction may be separated from a release agent rich fraction. Each fraction can be treated separately in conventional recycling processes, or combined with other sources of materials for further processing.

The waste material can be collected from the producers and end users of for example adhesive labels, etc. like offices and administrations, but it is preferably collected from industries generating large amounts of waste liners. In particular, the waste material can be collected from liner manufacturers, self-adhesive labels manufacturers, label printers, producers of goods on which are applied self-adhesive labels, and the like. These represent a particularly advantageous source of "clean" waste release coated carriers, available in large quantities. Another group are the producers and/or users of cast polymeric sheet materials or self-adhesive tapes whereby the liner is being used as a support during the cast or coating process and is optionally being removed prior to selling the material to the end users. Liner manufacturers will of course generate some waste, be it for insufficient quality of a particular product batch or at start or end of a roll. The manufacturers of self-adhesive label base material combine large rolls of release coated material with corresponding rolls of label base material to form a 4-layer laminate comprising the carrier, the release coating, the adhesive, and the label support. The thus produced laminate is then slit to the desired width of the labels, thus generating large amounts of waste. The same applies with label printers, if different from the former, as they may be in charge of the final cutting of the labels. Finally, the producers of goods on which are applied self-adhesive labels will generate as much liner waste as self-adhesive labels are applied on their goods. The amount of waste liner material thus generated can be huge and these industries are usually equipped with automated collecting means for collecting the waste liners, as described e.g., in WO2005110902. In most cases, the huge amounts of waste liners thus collected are in the form of dense, bulky masses, usually rolls or stacks.

Figure 2B:
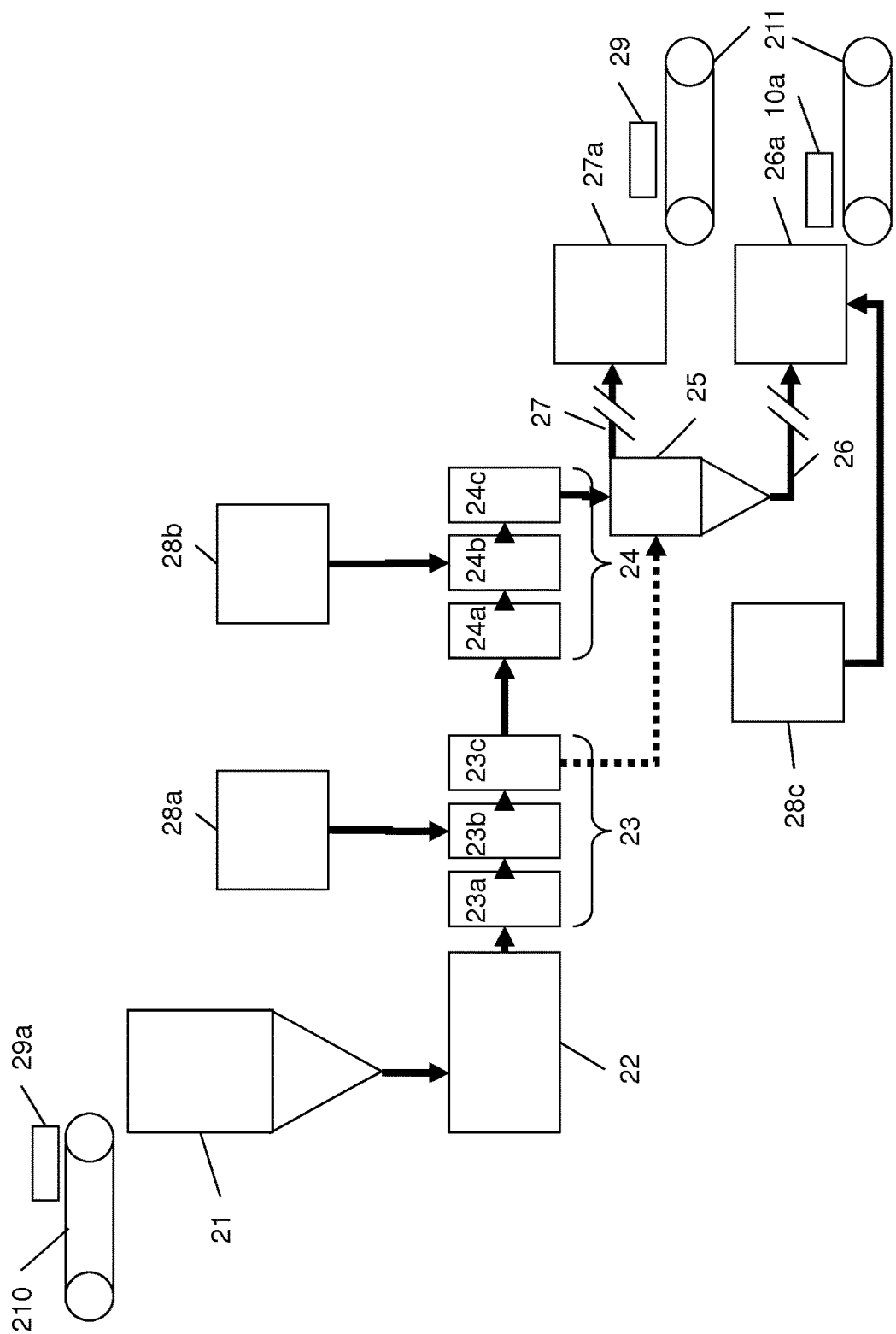
FIG. 2B: shows a schematic representation of a second embodiment of the method of the present invention.

As illustrated in FIGS. 2(a) and 2(b), the collected release coated sheet waste material may be conveyed with supplying means (210), such as a conveying belt, to a supply station (21). If the collected material is in the form of dense, bulky masses (29a), such as rolls or stacks of liners, which cannot be ground as such in conventional dry-grinding lines, the material is first supplied from supply station (21) to a pre-shredding station (22), breaking the dense masses of sheet material into looser chunks and lumps of smaller sizes suitable for being ground in dry conventional grinding stations. Pre-shredding stations suitable for the purpose of the present invention can be found, as illustrative purpose and in no way being restricted thereto, in the catalogue of the company SSI Shredding Systems (cf. e.g., www.ssiworld.com/watch/industrial_paper.htm and www.ssiworld.com/watch/printers-waste.htm). At this stage, the thus pre-shredded chunks of waste material are comparable in size and texture with more traditional sources of household waste sheet material comprising newspapers, magazines, packaging, etc., and may from here on be blended with other such sources of waste material. The release coated waste material, blended or not with other sources of waste material, can be prepared for primary grinding by mixing it and removing all foreign bodies such as metal clips, staples, plastic sheets in case of cellulose waste material, and the like.

At this stage, the material can be shredded and dry-ground into particulate material in a grinding station (23), (24). It is often preferred to use several grinders, which can be grouped as a primary, coarser grinder (23) and a secondary, finer grinder (24). In the primary grinder (23), which may itself be composed of a cascade of several grinders (23a), (23b), (23c), the thus prepared waste material is shredded into small pieces, preferably into stripes of an average length comprised between 5 and 30 mm, more preferably, between 7 and 20 mm, most preferably between 10 and 15 mm. For some applications, this size is sufficiently small and the material needs no further comminution steps. The primary grinding station (23) may be connected to an additive supply means (28a) to add further additives such as flame retardants, hydrophobic materials, pest repellents, and the like. The material may also be blended with other sources of waste material in the primary grinding station (23). The stripes thus obtained may also undergo a crimping process to yield an insulating material with higher specific volume. For many applications, however, it is necessary to further reduce the size of the particles to lower than 10 mm.

In these cases, the stripes of waste material may be transferred to a secondary grinding station (24). Like the primary grinding station (23) the secondary grinding station (24) may be composed of a cascade of several grinders (24a), (24b), (24c). In the secondary grinding station (24), the size of the stripes is further reduced to an average particle size smaller than 4 mm, preferably smaller than 2 mm; more preferably smaller than 1 mm. Here again, the secondary grinding station (24) may be connected to an additive supply means (28b) to add additives. Suitable primary and secondary grinding stations may be found, for example, in WO2005/028111 and in www.scribd.com/full/27498804?access_key=key-2ed7qzqp8la1u1hgo86i.

Grinding includes spraying of a limited amount of liquid onto the material as well as the formation of a suspension of the treated material in a liquid as in conventional paper repulping processes. Preferably, at all time during the shredding and processing the treated material is in a solid form.

As illustrated in FIG. 2(a), from the end of the primary grinding station (23c) or, if it applies, of the secondary grinding station (24c), the particulate material 26(b) is transferred to a treating station (26c) for e.g., shaping the material into sheets, panels, batts, etc. and/or for packaging. The treating station (26c) may be connected to an additive supply means (28c) to supply e.g., water, an organic or mineral binder (e.g., cement), flame retardant, a dye, or the like. Treating station (26c) may comprise any means for shaping the recycled particles in any desired form, such as a press to form e.g., panels, means for dewatering the slurry to form sheets, in case water was added after dry-grinding the material, curing means, such as convection, induction or IR-ovens, UV-station, etc, in case a binder is used, and the like. The recycled material (10) can then be removed with conveying means (211) and is ready for commercialisation as insulating material as dry particulate, sheets, panels, batts, and the like, as is discussed below. Alternatively, the comminuted material may be advantageously used as filler in concrete, cementitious mixtures and other building materials.

Another possible application for the thus recycled material (10) is in hydromulching or hydroseeding applications, with enhanced results compared with similar applications with conventional paper, in particular, with respect to dry crust formation and clogging observed with conventional paper.

The comminuted release coated material can also be used as casing soil in replacement of, or complement to peat casing soil used for growing some vegetables and mushrooms. A study has been carried out with general waste paper with some encouraging, though not concluding results (cf. Sassine et al., J. App. Sci. Res., 1, (3): 277 (2005)). Some preliminary tests suggest that some of the problems mentioned in Sassine's paper could be solved with the material (10) produced from the present method thanks to the presence of the release agent, which yields a proper degree of hydrophobicity without affecting the moisture buffering effect of cellulose. For such end-applications, the treating station (26c) could include composting means and the additive supply means (28c) may further include a source of nitrogen and possibly a source of a hydrophobic material. Composting and nitrogenation are preferably carried out off-line from the grinding line, as illustrated by the broken line (26b). It can also be taken profit of the advantageous behaviour of the materials produced with the method of the present invention by using it as additive to earth, to enhance the water balance and water flow in said earth and soil.

The treated material shows a relatively high heat capacity, storing energy that it releases gradually to ambient. This property could partly explain the excellent results obtained with mushrooms. The compost layer is the layer containing fermented manure, straw and some different additives, and acts as feeding stock for the growth of the mushrooms. This compost layer is covered by casing soil onto which the mushrooms start growing. The current problem with this system is the initial rising of the temperature of the compost in the first days of the process. This leads to too fast and uncontrolled mycelium growth. The traditional way of solving this problem is to cool down the whole atmosphere in the room. Besides costing a lot of energy, the negative effect of the cooling is a slowing down of the entire growth cycle by several days. In the recent years, techniques have been developed to only cool down the compost layer and not the entire atmosphere of the room anymore. This necessitates cooling tubes to be integrated in the mushroom beds which is a costly exercise investment wise. The relatively high specific heat of the present material allows to reduce the temperature increase of the compost in the first days, thus replacing the use of a cooling system. The thermal energy accumulated by the present material during the first days of growth is released to the system in the following days thus enhancing growth of the mushrooms. Additional benefit of the cellulose fibres added to the compost would be the increase of water content so that the nutrients become more easily available for the mushroom growth.

The property of the present material to act as a heat capacitance, absorbing thermal energy that it releases gradually in time can advantageously be used in heated pillows and compresses to be applied on the skin, or to not only passively insulate a piece of good contained in a package, but actually actively heating it.

In some cases it is possible that a substantial fraction of the release coating is mechanically released from the carrier during the primary or secondary grinding stages (23), (24). This may happen in particular during the dry-grinding stage, which generates intense shear stresses that may provoke cohesive failure in the carrier material, close and parallel to the interface between carrier and release coating. This phenomenon is observed in particular with cellulose carrier material of rather low density, wherein the hydrogen bonds between not so closely packed cellulose fibres are weaker than the interfacial bond between the release agent and the cellulose carrier. Cohesive failure is less likely to happen with thermoplastic carriers, but some separation of the release coating was observed nonetheless with some particular materials combinations, in particular when low surface energy thermoplastic carriers were used, such as polyolefins. In this case, however, the failure was more interfacial. Regardless of the nature of the failure, if a substantial fraction of the release agent may be separated from the carrier material, it may be interesting, as illustrated in FIG. 2(b), to profit of this debonding to actually separate the material stream in two fractions: a carrier rich fraction (26) and a release agent rich fraction (27) in a separating station (25). The separating station may comprise any known means for separating two bodies having differing physical and chemical properties, such as, for example, a cyclone, a floatation station, a filter, and ultrasonic or electrostatic separation means, and any combinations thereof.

The release agent rich fraction (27) may further be processed in a treating station (27a) to to be suitable for use as a filler or a binding agent in concrete, cementitious, asphalteous, clay or lime mixtures and coatings. Alternatively, the release agent rich fraction (27) may be added to a stream of cellulose insulation material based on waste paper other than release coated, such as newspapers, magazines, packaging material, and the like, to enhance the properties thereof.

The carrier rich fraction (26) may further be processed in a treating station (26a) to produce, as discussed above in respect of station (26c) in FIG. 2(a), an insulating material of more accurately controlled composition or, alternatively, to produce recycled paper by methods well known in the art in case of cellulose carriers. The recycled product (10a) can then be removed with conveying means (211). The further treatment of both fractions in treating stations (26a), (27a), in particular if it concerns producing recycled paper with the cellulose rich fraction, needs not necessarily be carried out continuously in the same production apparatus but, as illustrated by the broken lines (26), (27), it may be carried out in another plant.

As illustrated schematically in FIG. 3, the treated material can be used as insulating material (10) to be applied in different forms and different ways to a surface; As shown in FIG. 3(a) the insulating material (10) may be blown in a dry form with a gun (20) into a cavity (13) formed by two panels or walls or any retainer (14). In old houses, the material can be blown through a hole drilled on top of the outer panel of a wall. The insulation material (10) must be blown until it reaches the appropriate density. With this form of application settling is observed and may reach as much as 20% with state of the art cellulose insulation materials. It is usually observed that a lower degree of settling occurs with higher initial densities. The level of settling is very much reduced with the insulation material of the present invention since the silicone acts somewhat like a loose binder that stabilizes the structure. After settling of the material, the front panel may be withdrawn if desired as, depending on the degree of compaction thereof, the material will remain in place. The application of the insulating material (10) by dry blowing has the advantages of minimizing air gaps especially around inserts or intricate regions. It is, however, recommended to call an experienced installer for dry blowing the insulation material as the control of the density, settling, and pressure applied on the panels must all be controlled carefully.

The insulating material (10) in a particulate form may also be sprayed in place with a gun (20) against a wall (14) or even a horizontal ceiling by mixing it with a fluid like water. Upon drying the material will remain in place thanks to the hydrogen bonds between cellulose hydroxyl groups created by the fluid such as water. In some cases, in particular—albeit not exclusively—when the carrier (2) is a thermoplastic material, the use of a binder may be necessary in this type of applications. This technique of wet spraying is schematically illustrated in FIG. 3(b) and it has the advantage over dry blowing of requiring no cavity (13) to fill, of generating substantially less dust upon application, and of settling much less. Air gaps are minimized with this technique, thus enhancing the insulation properties of the material. Here again, calling an experienced installer is highly recommended.

As an alternative to supplying the insulation material (10) in a particulate form for blowing/spraying, it can be supplied as preforms (10A) such as batts, sheets, mats, tiles, or even bricks. Here again, the use of a binder may be necessary, but not mandatory, as with cellulose materials sufficient integrity of the preforms may be obtained through a wet process. If a binder is used, it can be organic, like a glue or a resin, or mineral like cement, gypsum, etc. Fillers like sand, talc, etc. may be used too. Alternatively, the preforms (10A) may have a sandwich structure with two skins holding a central core made of the insulating material (10). In some instances, a single skin may be sufficient. The role of the skins is not restricted to mechanical integrity of the preforms (10A), but may advantageously act as a barrier against moisture, gas, radiations, etc. and can therefore be useful when a binder is used too.

As illustrated in FIG. 3(c), such preforms can then simply be applied and fixed to a wall by means well known in the art. This solution has the advantage of being very simple and of requiring no particular expertise for its implementation, and it also generates virtually no dust in situ. On the other hand, air gaps are more difficult to avoid then with blowing/spraying techniques.

FIG. 3 illustrates embodiments of applications in the insulation of a building. The insulation material of the present invention can be used in other fields such as the transportation industry, e.g., in applications as disclosed e.g., in DE202005014581 and US2002025421 for the automotive industry and in DE4331567 for the aircraft industry. It can also be used on sound dampening wall along roads. Other applications can be found in the textile industry, as fill for quilted garments and blankets or even for upholstery and mattresses.

When cellulose insulation material has a lower "embodied energy" than e.g., glass fibres or rockwool insulation materials, the insulation material of the present invention has an even lower embodied energy than most traditional cellulose insulation materials for the following reasons. Traditional cellulose material is generally made of recycled paper of various origins, including newspapers, printed matter, wrapping papers, etc., which may need an additional treatment to eliminate inks and volatile components before being reprocessed into insulation material. This additional treatment usually involves a thermal treatment with chemicals, which is not necessary with waste liners collected from industrial end users, as the material is homogeneous and devoid of any printed matter. Another advantage of the insulation material of the present invention is that packaging volume can be reduced with respect to most traditional cellulose insulation materials on the market. Particulate cellulose insulation material is generally supplied in 10-15 kg packages with a degree of compaction which is limited by the ability of the compacted material to fluff up to the desired density upon dry blowing thereof. Generally, the degree of compaction of the packaged materiel is about double of the desired density of the insulation material in place when applied dry, i.e., with one package of volume $V_1$, a cavity of volume of the order of $2 \times V_1$ can be filled. It has been found that insulation material according to the present invention could be dry blown to a desired density even when the material was packaged with a degree of compaction of three or four (i.e., down to a volume of the order of $\frac{1}{2} V_1$). Without being bound by any theory, it is believed that this is explained by the fact that cellulose liners being produced from virgin material, the cellulose fibres are longer and stiffer than the ones of recycled newspapers and the like. Hence the particulate material obtained by grinding used liners has a higher spring force than most traditional cellulose insulation materials which allows it to recover a high degree of fluffiness after compaction to at least 400% in a package. The higher degree of compaction is, of course, highly advantageous for storage and distribution of the products. These two advantages: no thermal and chemical deinking stage required and higher degree of compaction of the packaged material lowers substantially the embodied energy of the insulation material of the present invention in both the energy required to manufacture the material and in the energy to deliver it.

Beside providing a cheap and easy recycling option for the problematic release coated sheet carriers, the insulation material obtained with the method of the present invention is advantageous over other similar materials of the prior art, even without separation of the release coating from the carrier, because the presence of the generally crosslinked release agent such as silicone gives the particulate material a cohesion which cannot be found in the prior art materials without the addition of a separate binder. This cohesion is advantageous in dry blow applications (cf. FIG. 3(a)) because it reduces substantially the amount of dust upon blowing, and it especially reduces substantially the level of settling of the material, yielding an insulation layer stable in time and homogeneous throughout the height of the insulated wall. In wet spraying applications (cf. FIG. 3(b)), a higher mechanical integrity of the sprayed layer is reached thanks to the release agent. For the manufacture of preforms (10A) such as batts, sheets, etc. (cf. FIG. 3(c)), less to no binder is needed to yield self supporting preforms. In all cases, the presence of silicone particles dispersed within the bulk of the insulating material confers a degree of water repellence, which contributes to preserving the material from moisture. Furthermore, traditional insulation materials are made of recycled paper, of different origins (landfills) and of unknown nature (newspaper, packaging, etc.). For this reason and in spite of any thermal treatments discussed above, such insulation materials may still contain an undesired amount of VOC (volatile organic compounds) which contribute to indoor air pollution; and may be responsible for the development of allergies (cf. e.g., http://www.healthyhouseinstitute.com/a_688-Cellulose_Insulation). With the present invention, it is possible to obtain an insulation material which, apart from the flame retardants, is virtually free of any VOC. In particular, since large volumes of release coated sheet material can be recovered directly from companies, a control on the quality of the waste material to be recycled never afforded to date is possible, thus allowing to provide a "premium version" of VOC-free insulation material. In some cases it also provides a very efficient solution to the production of recycled paper from waste release coated sheet material.

In applications requiring the use of a flame retardant, as in the fields of building, transportation, and filled furniture, the addition of a flame retardant, such as boric acid is added into the formulation upon making the recyclable product. This step increases substantially the overall drive towards reuse of waste material and is further triggered by the fact that the recyclable material is acting as a vehicle for hosting an additive and whereby said additive will find its use into a recycled product and drives the recycle chain towards new uses of recyclable products. It is believed that, for example, an additional flame retardant dosing station with metering means must be provided in the material treatment apparatus, prior to packing and shipping the recycled product, represents an additional investment.

The addition of a flame retardant, such as boric acid, added into the formulation upon making the recyclable product also dramatically simplifies the production of the recycled product thus requiring much less process control and vigilance, thereby making the production process of the recycled product extremely simple and in the majority of cases even possible with less complex and less costly production equipment.

Figure 4:
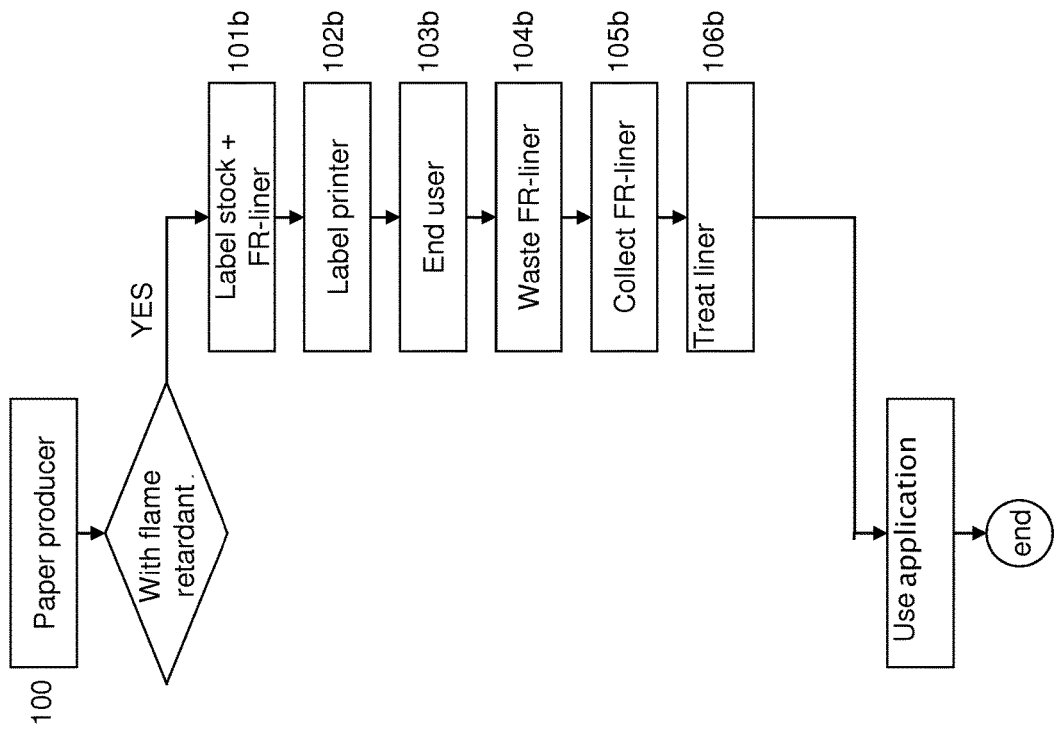
FIG. 4: is a flowchart illustrating the complete life cycle of a release coated sheet material form production, use thereof as liner, to recycling thereof, with the original sheet carrier comprising flame retardant.

In accordance with the present invention, it is proposed that the liner producers (100) treat their liners with flame retardant to yield flame retarded liners (FR-liners (101b) (cf. FIG. 4). The amount of flame retardant for treating a given amount of liner material is less if applied directly to the pulp by the liner producer, upstream of the life cycle of the material, than if added at any stage after collection of the liner waste material. Furthermore, since the flame retardant is more homogeneously distributed at the level of the cellulose fibres, it is likely that higher fire resistance classes can be reached by the paper producer with the same amount of flame retardant. These FR-liners would be sold at a higher cost to the printer (102b) who would sell their labels applied on flame treated liners to the end users (103b) to an overall higher cost, comprising the non refundable price of a label applied on a non flame treated liner+a refundable, recycling deposit for recycling the liner. After use of the labels (107) the waste FR-liners are collected as described above, and the recycling deposit is refunded to the end user, by the recycling operator, who can save money in flame retardant, and transportation. The material needs only be, preferably, dry-ground to the desired particle size prior to being used as insulating material in the building, transportation, furniture, or apparel industries (108) without the need of adding any additional flame retardant.

Even if the recycling deposit amounted exactly to the costs saved by the absence of a flame treatment step during the recycling process, this operation would be beneficial to environment, because less flame retardant would be needed, less lorries would be needed to transport the same weight of material, but with a reduced volume, and it would guarantee that the quasi totality of the liners would be recycled. This approach is unique in the involvement of the liner manufacturer, totally upstream of the life cycle of the produced liners, anticipating the second life of the liner as insulating material or filler in a piece of furniture or apparel. It also offers a new approach to the blowing/spraying method of insulating material in that fine comminuting and blowing/spraying could be operated in situ by the same operator, with a small transportable grinder coupled to a blowing/spraying gun, thus reducing substantially the cost of the material.

An insulating material according to the present invention is particularly advantageous because, on the one hand, it offers a solution for recycling huge volumes of release coated sheet material such as liners, which is otherwise very difficult to recycle and, on the other hand, because the properties of this material, in particular volumetric stability in time, are superior to most existing comparable products in the market, obtained from other sources of sheet materials.

The insulating material (10) of the present invention comprises shredded and ground particles of recycled release coated sheet material possibly admixed with further additives to control the resistance to flame, moisture, and pests, such as insects, bugs, rodents, etc. as discussed supra. For example, boric acid or any salt thereof is the most commonly used flame retardant and is particularly advantageous, since not only does it provide the required resistance to flame but it also provides moisture, mould, and microbial resistance and acts as a repellent against pests of different kinds. Salts of boric acid that can be used are for example, borax with different levels of hydratation, such as borax penthahydrate and borax decahydrate. Boric acid or salts thereof may be applied in an amount comprised between 1 and 50 wt %, preferably between 10 and 45 wt %, more preferably between 25 and 40 wt %. It can be added to the recycled material as dry powder but is in some cases mixed with water and wet sprayed into the recycled material. Other flame retardants, however, may be used instead of or additionally with the boric acid or salt thereof, such as mono- or diammonium sulphate, aluminium sulphate, aluminium hydroxide, soda ash, anhydrous silica gel, diammonium phosphate, sodium tetraborate, ferrous sulfate, zinc sulfate, and mixtures thereof, as disclosed, e.g., in U.S. Pat. No. 4,182,681.

The mixture of recycled material and additives (e.g., flame retardant) can then be used as such for blowing/spraying dry or with addition of some water to enhance adhesion to non horizontal walls (cf. FIG. 3(a)&(b)) or, alternatively, can be formed into a sheet, batt, or the like by pressing optionally with admixture of a binder and/or sandwiched between two sheets. Other additives or fillers may of course be added as well known by the persons skilled in the art.

Experimental Tests.

In order to demonstrate some of the superior properties of insulating material obtained by treating release coated sheet material, the following tests were carried out.

(a) Clogging Test.

Material clogging in a hose is a major issue when spraying the insulation material in place. This is particularly sensitive when there is a reduction of the tube diameter, e.g., for allowing access to thinner cavities. In this case, a tube reduction connector is used to connect two hoses of different diameter, as can be found, e.g., in http://www.x-floc.com/en/zubehoer/schlaueche-zub.html. Clogging often occurs at such reduction connectors when the spraying is resumed after an interruption. Clogging is to be avoided, not only because it is time consuming for the operator to stop the spraying, disconnect the hoses and clean them, before connecting them again and resuming the spraying, but also because the filling of a cavity with insulating material to a homogeneous density is better achieved if the spraying of material is continuous, and becomes very difficult to achieve if made in several spraying shots.

In order to assess the flowing properties of the insulating material according to the present invention, two 15 m long hoses were connected with a reduction connector with an inlet diameter of 65 mm and an outlet diameter of 40 mm, corresponding to the diameters of the two hoses. The hose system was then linked to a blowing machine (Zellofant M95 from X-Floc).

The test carried out intends to simulate a blowing situation wherein, at the end of cavity filling, the operator gives a last extra shot of material to prevent settling. At that moment, pressure continues to build up in the hose while there is hardly any material flowing out anymore and material density builds up in the hose. After 20 seconds, the operator finally switches off the machine and inserts the hose into another, empty cavity. At that moment, the flow in the connecting part between the 2 hoses is very critical, and if not sufficiently high, clogging occurs.

Two materials were tested:
 INVENTION: silicone coated cellulose liners ground to an average particle length of about 4 mm.
 COMPARATIVE: one of the major cellulose brands available on the Belgian market with an average particle length of about 4 mm.

Tests were performed 5 times with each material by filling a first cavity of dimensions 1000×400×100 mm, continuing blowing for 20 s after filling of the cavity to build up the pressure within the hose and switching off the pump. After 30 s, the pump was activated again with the hose introduced into a new, empty cavity.

The comparative cellulose material clogged 4 times out of 5 when started again, requiring the manual unclogging of the reduction connector, whilst the silicone coated cellulose material according to the present invention started flowing again immediately in all five repetitions of the test.

(b) Settling Test.

The same insulation materials as described in point (a) supra were used for testing the settling properties according to ISO/CD 18393, method B, wherein insulation material filling a cavity as described in point (a) supra is vibrated and the density of the material before and after vibrating is determined.

At initial densities ≥60 kg/m$^3$, no settling was observed neither for the inventive, nor the comparative cellulose insulating materials. At a lower initial density of 45 kg/m$^3$, however, the level of the comparative material dropped by a height comprised between 4 and 6 cm, yielding a degree of settling of 4 to 6 vol. %, which is acceptable yet detrimental, whilst the inventive cellulose material did not settle.

These two examples illustrate two major advantages of the insulating material according to the present invention over conventional insulating material. The enhanced flowability of the material resulting in substantially less clogging during dispensing of the material is clearly attributable to the presence of the release coating which reduces the frictions between particles during flow. The dimensional stability of the blown material, even at low degrees of compaction such as 45 kg/m$^3$, can also be attributed, at least partly, to the presence of the release coating.

The present invention therefore not only offers an economically and ecologically viable solution to the recycling of release coated liners, which are particularly difficult to recycle, but also provides an alternative insulating material with enhanced properties over the conventional insulating materials available in the market.

The invention claimed is:

1. A method for treating a plastic and/or paper waste material comprising the following steps:
 (a) collecting a plastic and paper waste material comprising a release coating on a cellulose or polymeric sheet carrier material, said plastic and paper waste material comprising selected new-use additive selected from hydrophobic material, pesticides, minerals, nutrients, herbicides and/or mixtures thereof;
 (b) preparing the collected plastic and paper waste material by separating foreign bodies, and feeding the prepared material to a grinding station; and
 (c) shredding and grinding the prepared material at the grinding station into small pieces to mechanically separate a fraction of the release coating from the sheet carrier.

2. The method according to claim 1, comprising:
 adding an additive to the collected material and mixing the additive in the material before the grinding.

3. The method of claim 1, comprising the steps of using the shredded and ground material:
 (a) for insulating thermally and/or acoustically any of:
  a wall, panel or roof in the field of buildings;
  a panel in the field of transportation;
  a sound dampening wall along roads;
  a quilted piece of garment or blanket, or for filling;
  a mattress, or upholstery;
  a package in the field of packaging and storage and transportation of goods; or
 (b) as casing soil or growing medium used for growing some vegetables and mushrooms, or as additive to earth to enhance the water balance and water flow in said soil or earth;
 (c) for hydromulching applications; or
 (d) as a filler, a binding agent or a viscosity modifier in concrete, cementitious, asphalteous, clay or lime mixtures and coatings, paints and other building materials; or
 (e) as heat storage in applications, the applications include hot pillows, or hot compresses to be applied onto the skin, heat capacitor for storage of goods and food, heat sink and capacitor for the culture of mushrooms.

4. A method for treating waste material comprising the following steps:
 (a) collecting release coated cellulose or polymeric sheet material from producers and end-users thereof, said material comprising a selected new-use additive selected from hydrophobic materials, herbicides, pesticides, minerals, nutrients and/or mixtures thereof,
 (b) preparing the collected material by mixing, separating foreign bodies including metals, and feeding the mixed material to a dry-grinding station; and
 (c) grinding the mixed material at the dry-grinding station;
 (d) separating a fraction of a release coating from a sheet carrier in the absence of chemical treatment of the mixed material thereby separating an incoming stream of the mixed material into a first, carrier rich fraction and a second, release agent rich fraction.

5. A method according to claim 4, adding additive to the material before or during the grinding if the collected material does not comprise a sufficient amount of additive for a given new use application.

* * * * *